United States Patent
Denton et al.

(10) Patent No.: US 7,043,322 B1
(45) Date of Patent: May 9, 2006

(54) SYSTEM AND METHOD FOR BATCH SCHEDULING OF LOTS BASED ON FLOW TIME AND NUMBER OF BATCHES

(75) Inventors: Brian T. Denton, Winooski, VT (US); Kenneth J. Fordyce, Hurley, NY (US); Robert J. Milne, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/906,825

(22) Filed: Mar. 8, 2005

(51) Int. Cl.
*G06F 19/00* (2006.01)
(52) U.S. Cl. .......................................... 700/100; 97/121
(58) Field of Classification Search .................. 700/99, 700/100, 101, 103, 121, 97
See application file for complete search history.

(56) References Cited

U.S. PATENT DOCUMENTS

| | | | |
|---|---|---|---|
| 6,584,369 B1 * | 6/2003 | Patel et al. ................. | 700/100 |
| 6,687,563 B1 * | 2/2004 | Wang et al. ................ | 700/100 |
| 6,782,302 B1 * | 8/2004 | Barto et al. ................. | 700/121 |

OTHER PUBLICATIONS

G. Dobson, and R. S. Nambimadom. 2001; The Batch Loading and Scheduling Problem, Operation Research, vol. 49, issue 1, pp. 52-65.
N. Govind, et al., "Resident-Entity Based Simulation of Batch Chamber Tools in 300MM Semiconductor Manufacturing", Proceedings of the 2003 Winter Simulation Conference.

* cited by examiner

*Primary Examiner*—Leo Picard
*Assistant Examiner*—Charles Kasenge
(74) *Attorney, Agent, or Firm*—Richard Kotulak, Esq.; Greenblum & Bernstein P.L.C.

(57) ABSTRACT

A system and method for utilizing computer-implementable decision support systems to determine factory schedules. Methodologies associated with the invention include advanced planning systems, optimization and heuristic based algorithms, constraint-based programming, and simulation. The method may iteratively assign lots to non-full batches based on comparison of the resulting impact to mean flow time with the continuously approximated cost per batch. Once lots have been assigned to batches, potential interchanges of lots among batches are explored. If the variable cost per batch changes from one interchange to the next, the method may backtrack and attempt to re-allocate lots to batches based on the increased cost per batch.

24 Claims, 4 Drawing Sheets

SYSTEM AND METHOD FOR BATCH SCHEDULING OF LOTS BASED ON FLOW TIME AND NUMBER OF BATCHES

FIELD OF THE INVENTION

The invention relates to batch scheduling generally, and more particularly, to batch scheduling of work-pieces based on consideration of flow time and the number of scheduled batches.

BACKGROUND DESCRIPTION

In a wide variety of logistics and manufacturing applications, the dispatching of shipping and/or production of lots is critical for smooth and reliable operation of the logistics or manufacturing systems. In manufacturing environments, shop floor software scheduling systems are used to decide the sequence of a set of queued lots to dispatch to a given tool in a manufacturing line. For simple manufacturing systems a first-in-first-out (FIFO) rule is often a reasonable choice. However, in certain specialized fields, such as, but not limited to, semiconductor manufacturing, there are various tool-specific or other scheduling attributes which make the FIFO rule a poor or infeasible choice.

Many manufacturing industries, including the semiconductor manufacturing industry, rely on a variety of tool sets to produce their products. Many tools, such as, but not limited to photolithography tools, process production lots one at a time. However, some operations, such as furnace operations, are batch operations that can process multiple production lots at a time. Illustratively, a conventional furnace may process up to six production lots at a time, but it is not a strict requirement that six lots be processed in each batch. Thus, manufacturers often have an opportunity to create smaller batches that can be released earlier, rather than waiting for a full batch of the lots to arrive. The decision whether to release the lot early and process a smaller batch or to wait for additional lots to arrive is a problem that balances the competing interests of increased flow of lots as compared with, decreased batch costs, and one that requires a practical solution.

Releasing smaller batches, rather than waiting for a complete batch, can improve tool efficiency and processing time for lots. However, these improvements in efficiency come at the expense of increased batch costs, which may remain fixed whether one lot is processed or whether six lots are processed together. For instance, consider the following simple example. A furnace tool currently has a single lot in queue and no lots are projected to arrive for six hours. If the batch processing time is less than six hours, and there are no substantial variable costs per batch, then it is sensible to release a batch with a single lot to reduce its flow time, rather than have the lot wait in front of the idle furnace for six hours to construct a full batch.

Similarly many shipping companies rely on a limited number of delivery routes and/or delivery mechanisms (e.g. trucks and airplanes). These delivery routes and delivery mechanisms are batch operations that can process multiple lots or packages at a time. Thus, shippers often have an opportunity to create smaller batches that can be delivered earlier, rather than waiting for a full batch of the lots to arrive. The decision whether to deliver the lot early and ship a smaller batch or to wait for additional lots to arrive is a problem that balances the competing interests of increased flow of lots as compared with, decreased batch costs, and one that requires a practical solution.

There has been substantial study of scheduling in manufacturing operations in the operations research and industrial engineering literature (e.g., Baker—*Elements of Sequencing and Scheduling* 1994 describes several of the classical problems referenced in the scheduling literature). Batch scheduling has also been explored (e.g., Fowler—"Control of Multi-Product Bulk Service Diffusion/Oxidation Processes," IIE Transactions, 1992 contains several references). In one conventional system referenced in the journal "Operations Research" (Dobson and Nambimadom, 2001, "The Batch Loading and Scheduling Problem"), only a single criteria (average flow time) is considered for evaluating schedules. This approach however, does not consider the added variable of per batch costs. The referenced article also makes several liberal assumptions (e.g., all lots available at time zero) that do not take into account situations where lots are arriving at different discrete time intervals. Thus, a need exists for a system and method that optimizes batch scheduling while considering multiple variables, such as but not limited to, lot flow time and per batch costs.

SUMMARY OF THE INVENTION

In one aspect of the invention, the system and method integrates the consideration of batch scheduling constraints in a factory scheduling system and generally relates to factory scheduling, decision support systems, and optimization models. Although described herein with reference to its use in the semiconductor manufacturing industry, the inventive system and method has broad applicability to a wide variety of industrial applications. For example, a system and method constructed and implemented according to the principles of the invention may be used in a shipping environment to schedule the loading of packages onto transport vehicles. Alternatively, a system and method constructed and implemented according to the principles of the invention may be used in any environment where one or more work pieces are capable of being processed as a batch such as in an automotive or consumer electronics manufacturing environment.

Another aspect of the invention is directed to a method of scheduling work-pieces to determine a production plan. The method includes assigning lots to batches based on a comparison of a resultant impact to a mean flow time with a continuously approximated variable cost-per-batch. The method further includes iteratively reassigning one or more of the assigned lots based on output feasible lot alternatives and a set of convergence criteria to optimize the resultant impact to the mean flow time and the variable cost-per-batch.

Still another aspect of the invention is directed to a process of associating one of a plurality of lots to a plurality of batches for one of dispatching, shipping, producing, and manufacturing. The process includes allocating the plurality of lots to the plurality of batches, repeatedly assigning at least one of the plurality of lots to the plurality of batches, determining when to stop repeatedly assigning, and selecting a specific assignment of the plurality of lots to the plurality of batches to optimize a resultant impact to a mean flow time and a batching cost.

Yet another aspect of the invention includes a computer program product that includes a computer usable medium having readable program code embodied in the medium. The computer program product includes at least one component to sort a plurality of lots into one of a plurality of batches, repeatedly assign at least one of the plurality of lots to a different one of the plurality of batches, determine when to stop repeatedly assigning, and select a specific assignment of the plurality of lots to the plurality of batches to optimize a resultant impact to a mean flow time and a batching cost.

DETAILED DESCRIPTION OF THE INVENTION

The invention is a system and method for optimizing the scheduling of batches in manufacturing, shipping, or other environments where one or more lots or work pieces are capable of being processed as a batch. Although described below with reference to a manufacturing industry, this description is provided merely as an example of the types of industries in which the principles of the invention have applicability. Consequently, the descriptive examples provided herein are not to be used to restrict or limit the invention. Instead, it is specifically intended the principles of the invention should be implemented in one or more work environments that are not specifically enumerated below, although limitations of space and time prevent their recital herein.

The problem of how best to optimize scheduling of batches in view of the trade-off between increased lot flow and per batch costs may be understood in the exemplary context of scheduling batches for one or more WETS tools located on a 300 mm semiconductor manufacturing line. WETS tools soak batches of semiconductor wafers in a series of chemical baths.

Figure 1:
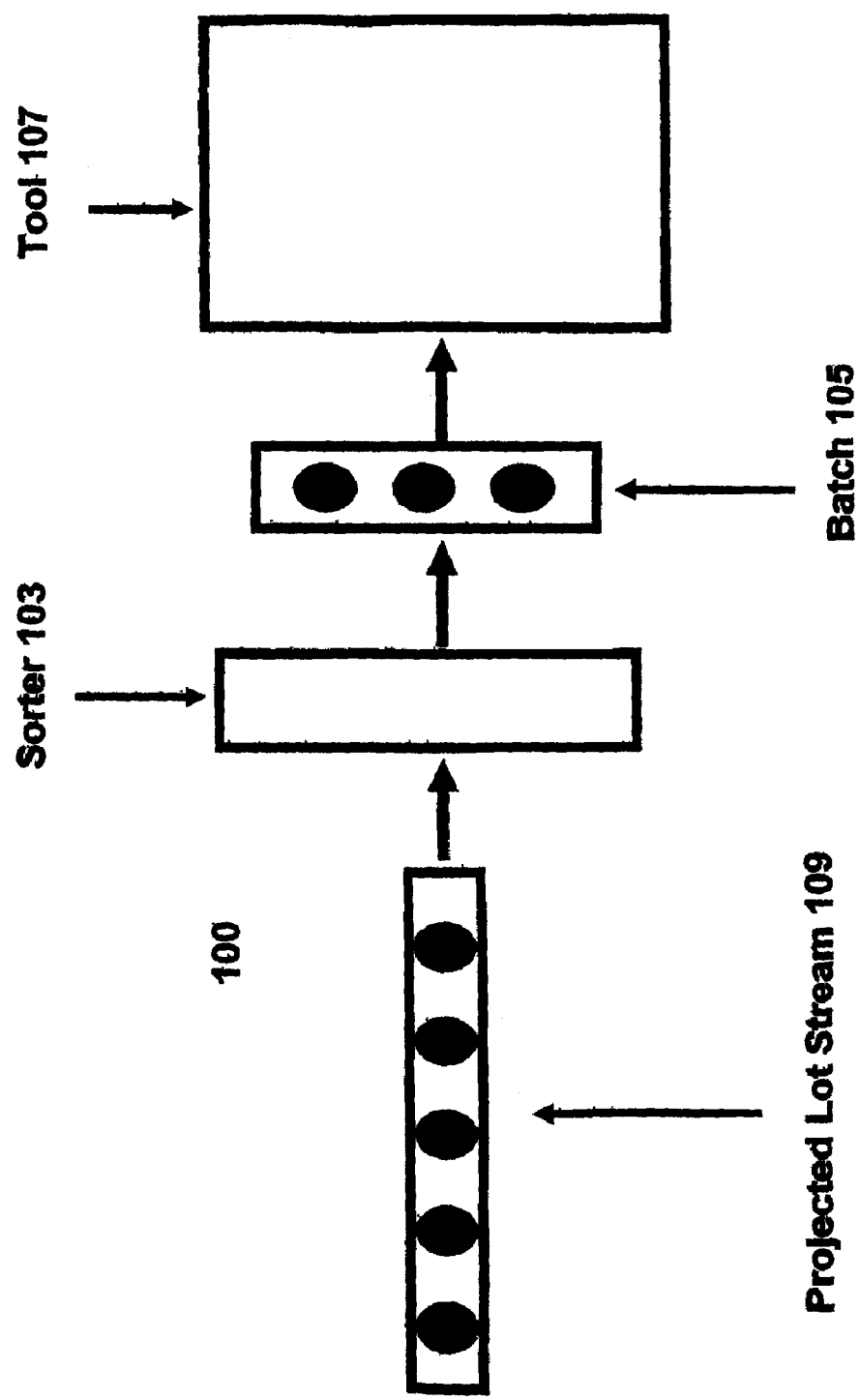
FIG. 1 is a diagram illustrating a batch scheduling process in which lots are sorted and allocated to a fixed batch for processing.

FIG. 1 is a diagram illustrating a batch scheduling process and system 100 in which production lots 101 are sorted by a sorter 103 and allocated to a fixed batch 105 for processing by a manufacturing tool 107. FIG. 1, thus provides a visual illustration of the problem associated with scheduling batches for WETS tools. After arrival at the WETS tools area, the lots 101 are sorted or grouped into batches 105 which are then processed on a WETS tool 107. Although only a single WETS tool 107 is depicted in FIG. 1, the principles of the invention may be used to schedule batches for a plurality of WETS tools that operate at the same or different times. To support advance scheduling of the WETS tools area, a projected or forecasted stream of lots 109 and their expected arrival times may be input to the scheduling method of the invention.

WETS tools are different than other batch tools, such as furnaces or transport vehicles, in that there is a substantial variable cost associated with the processing of chemicals used by the WETS tool. Since the chemicals must be replaced for each batch, regardless of batch size, there is a per-batch-cost. Furthermore, this cost increases significantly if a certain threshold is exceeded, due to constraints on the quantity of chemical processing per day. This attention to costs associated with batches is a departure from conventional batch scheduling methodologies since it alters the traditional scheduling objectives (e.g., mean flow time and makespan). Other departures from conventional methodologies in this context may include: consideration of lot arrivals spread across time, nonlinearity of variable batch costs, and the combination of a greedy and interchange algorithm applied iteratively to selectively improve batching.

Figure 2:
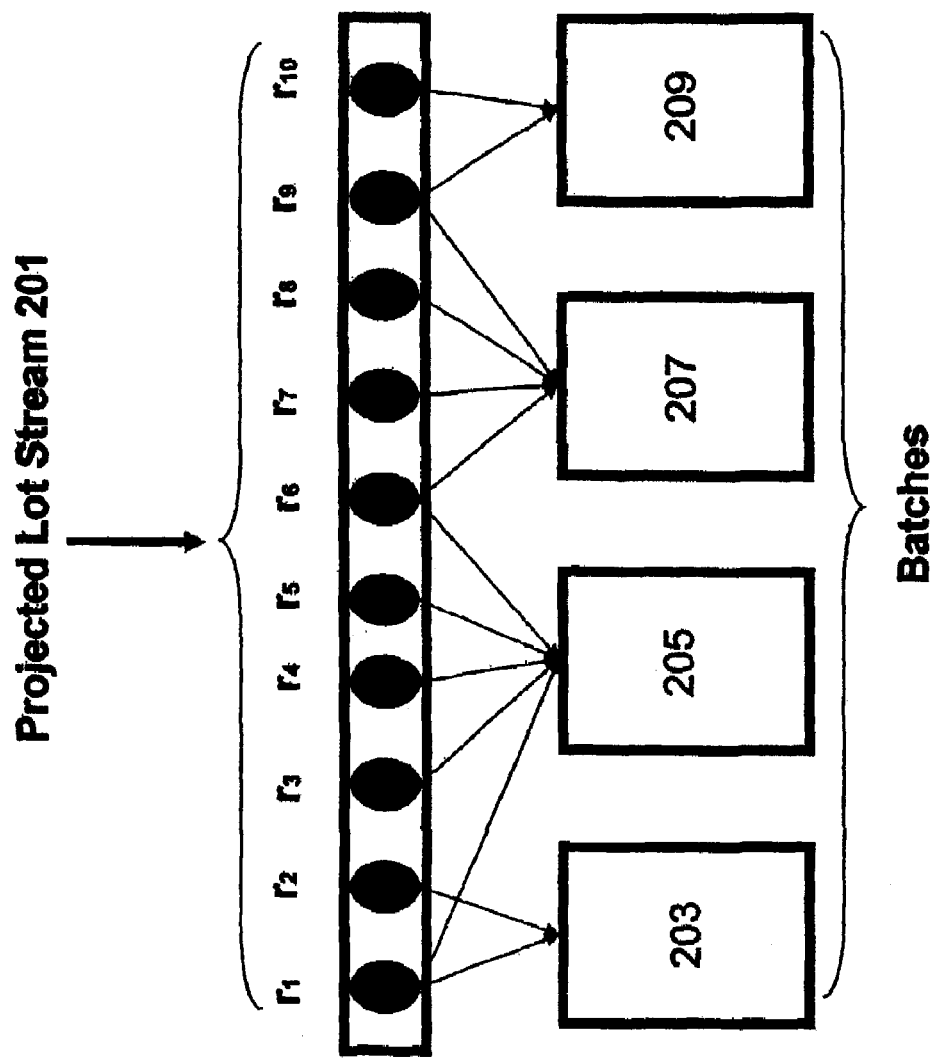
FIG. 2 is a diagram illustrating possible allocations of a lot stream to a set of batches.

In one aspect, the invention may provide a method and system for optimizing the release of production lots 101 to batch tools that have variable costs associated with each batch, and which can exploit a pre-sort operation to achieve tighter lot packing within a batch. The inventive method and system balances two criteria (a) average flow time, i.e., the average time it takes a lot to clear the batch operation, from the time the lot is available for dispatch to the WETS station, and (b) the total number of batches in a given planning horizon. These are often competing criteria, and based on these criteria lots must be allocated among a set of potential batches. FIG. 2 illustrates this allocation.

FIG. 2 is a diagram illustrating possible allocations of a lot stream 201 to a set of batches 203, 205, 207, and 209. The lot stream 201 includes one or more work-pieces (e.g., lots) $r_1$, $r_2$, $r_3$, $r_4$, $r_5$, $r_6$, $r_7$, $r_8$, $r_9$, and $r_{10}$. The work-pieces may be routed or assigned to the batches 203, 205, 207, 209 in a FIFO order (not shown) or in a non-linear order as shown. For example, $r_1$ and $r_2$ may be assigned to batch 203 (as shown by the arrows). Alternatively, $r_1$ could be routed to batch 205 together with $r_3$, $r_4$, $r_5$, and $r_6$. Similarly, $r_6$ could be assigned to batch 207 together with $r_7$, $r_8$, and $r_9$. Additionally, $r_{10}$ could be assigned to batch 209 with or without $r_9$.

For example, since the projected time that lots $r_1$–$r_{10}$ are available for release depends on the arrival time at the batch operation, the schedule that minimizes the number of batches 203, 205, 207, and 209 may result in unacceptably poor mean flow time (e.g., lots $r_6$ and $r_9$ that could be processed in batches 205 and 207, respectively, will be forced to wait for future batches 207 and 209, respectively, to arrive in order to optimize batch efficiency). On the other hand, the schedule which minimizes the mean flow time may result in an excessive number of batches, each with an associated variable cost. Furthermore, for some operations, there is a target number of batches beyond which additional (and high) costs are incurred for processing. As a result, it is critical for these types of operations to have a method which effectively trades off the two criteria.

Figure 3:
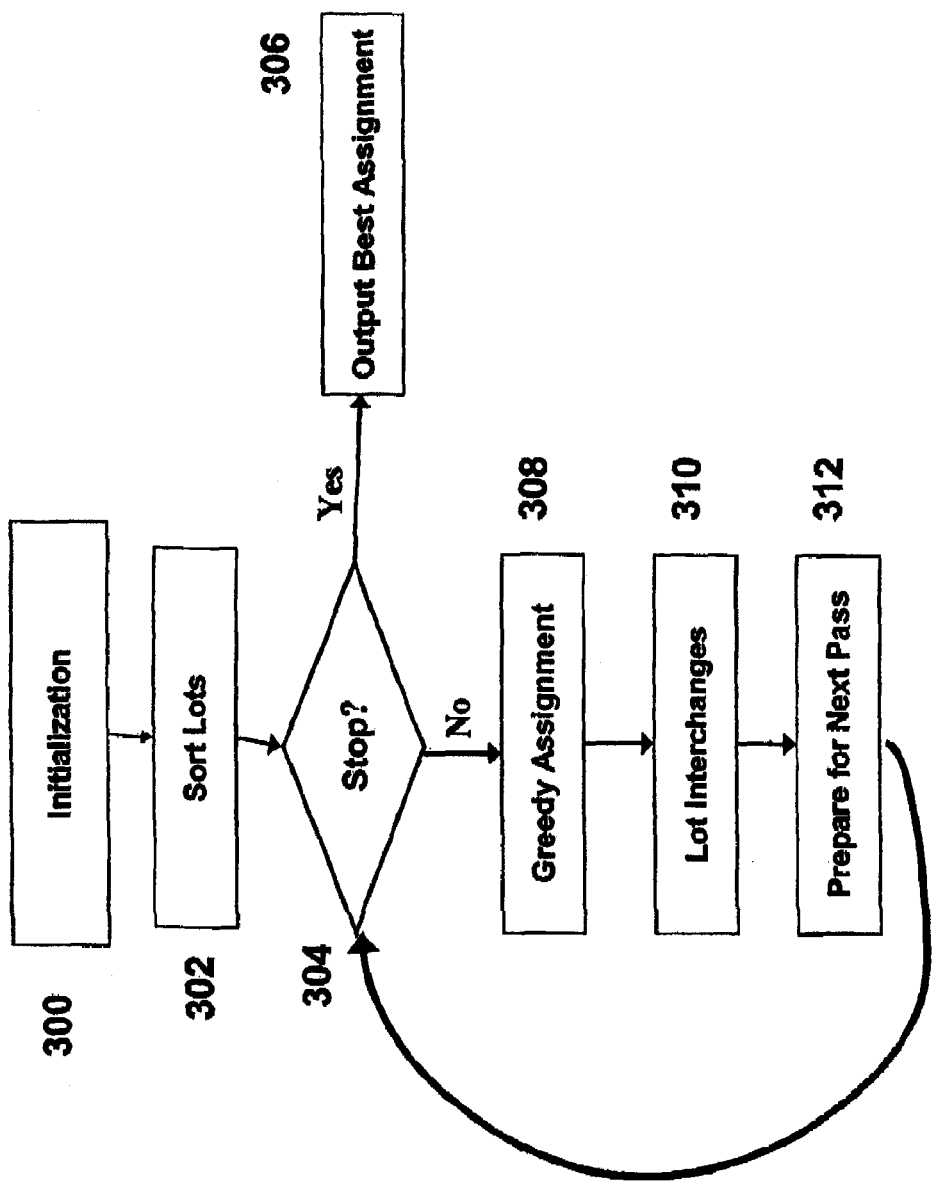
FIG. 3 is a flowchart illustrating one aspect of a method of the invention.

FIG. 3 is a flowchart illustrating one aspect of a method of the invention that assigns lots to batches based on balancing a cost penalty associated with mean flow time and a fixed cost per batch. More specifically, logic step 300 initializes a system state to a condition of no lots being yet assigned. Next, logic step 302 sorts the lots into an ascending sequence based the respective arrival times of lots. In case of ties in the arrival time, the decreasing priorities and descending quantities of the lots are secondary and tertiary sorting criteria respectively.

After the sorting in logic step 302, the method executes a series of iterations. Each iteration assigns lots to batches based on an estimated batch cost which changes based on the results of each iteration. In logic step 304, it is determined if the method should stop iterating. The method stops iterating when minimal improvement (based on a predetermined or user defined tolerance) is being made in the lot assignment or when a predetermined iteration limit has been reached. Once the iterations of the method stops, the best lot assignment found during an iteration is output to the dispatching system in logic step 306.

An iteration begins in logic step 308 which is a greedy assignment of lots. The greedy assignment process is disclosed below with respect to FIG. 4. Following logic step 308, logic step 310 examines possible pair-wise lot interchanges and executes an interchange if it improves the lot assignment. If the lot assignment resulting from logic step 310 is superior to the best assignment found thus far, then logic step 312 updates the latter with the former, that is, the iteration has found a new "best assignment found thus far." Subsequent to logic step 310, logic step 312 prepares for the next iteration by updating, amongst other things, the iteration count and batch cost.

Figure 4:
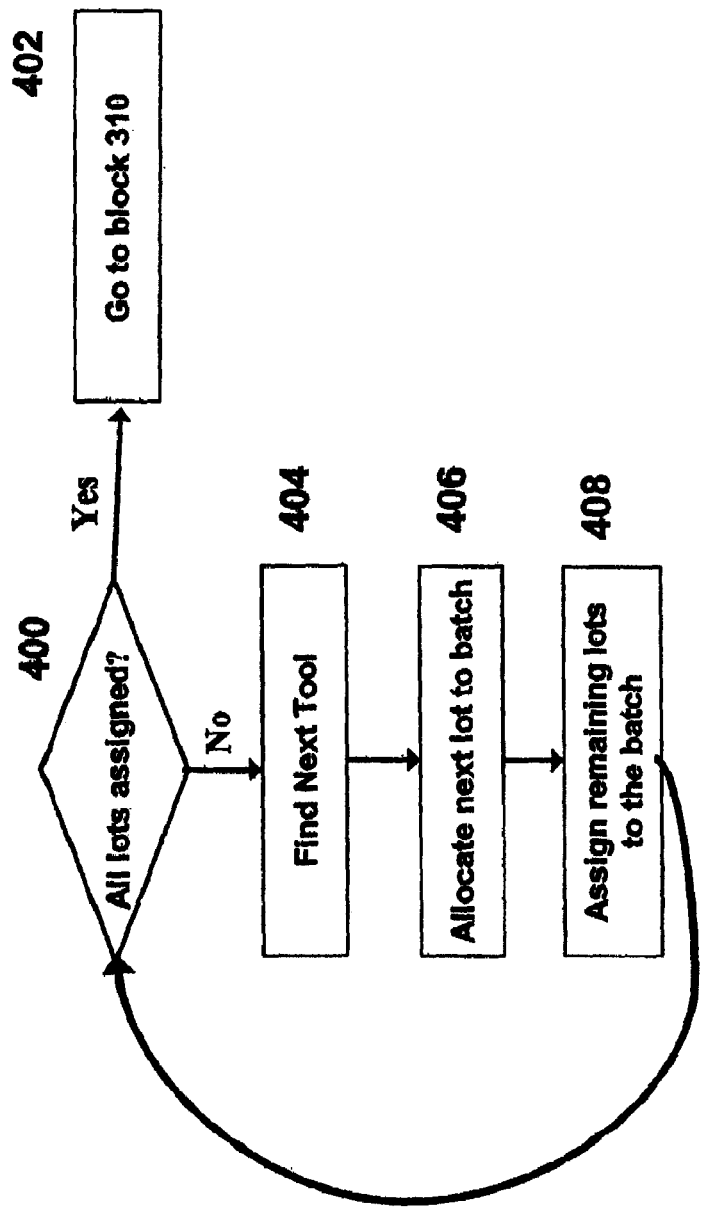
FIG. 4 illustrates the specific logic of the greedy assignment of lots of FIG. 3 of the invention.

FIG. 4 more specifically illustrates the greedy assignment of lots described in conjunction with logic step 308 noted above. When logic step 308 is invoked, lots have not been assigned to any batches. One batch is allocated each time through the loop, which begins with logic step 400. Logic step 400 checks to see whether all lots have been assigned and, if so, invokes logic step 402, which transfers control to logic step 310. Presuming not all lots have been assigned, logic step 400 transfers control to logic step 404, which finds the tool, which will next be available for processing a batch. The next unassigned lot in the sorted sequence is assigned to the tool's batch in logic step 406. Logic step 408 assigns any further lots to the batch. This assignment step is completed by examining each unassigned lot, in sequence, and determining whether an incremental impact on the objective function from adding the lot to the batch is favorable or adverse. The incremental impact is estimated by comparing the impact of the increased flow time resulting from the batch waiting for the lot to arrive with the savings stemming from releasing few batches. If the net impact is favorable, the lot is added to batch, otherwise the lot is not added. This is referred to as a greedy assignment because the decision on whether to add the lot is made without examining the impact of the assignment on other lots which have not yet been assigned. Once the tool's batch is full or all unassigned lots have been examined, logic step 408 returns control to logic step 400 so that further unassigned lots will be assigned to batches.

If the variable cost per batch changes (i.e. if the number of batches changes, and hence the per batch cost changes) from one pass of the heuristic to the next then the algorithm backtracks, to reallocate lots to batches based on the increased cost per batch. This continues until either the number of batches resulting from the allocation converges, or the improvement in the objective function triggers a tolerance based stopping criteria.

The following is an elaboration on the method described above for balancing mean flow time and the number of batches scheduled for a batch operation.

NOTATION—Method Inputs b: batch index is a number of work pieces capable of being processed together.

i: lot index, also referred to as a "job," is one or more work pieces transported together to a batch area. For example, although a furnace may be capable of processing 100 work pieces at time, jobs of 25–30 work pieces each may arrive at the furnace at different time intervals.

j: tool index indicates a different batch processor (e.g., furnace, WETS tool, transport vehicle, etc.).

J: number of independent tools, e.g., number of independent batch processors.

N: number of lots to be scheduled within a specified time window (e.g., 2 days).

r(i): arrival time of lot i at the manufacturing tool area.

B: number of potential batches (based on an estimated upper bound), e.g., the number of batches to be processed within the specified time window.

BS: batch Size, i.e., maximum number of work pieces per batch (100 for example).

BC(b): fixed cost for releasing batch b; That is, the cost of resources/materials used to process a batch.

RP: raw processing time for a batch at a manufacturing tool such as for a WETS tool, this is the length of time a batch is dunked/sprayed.

S(i): # of wafers in lot i.

c(i): penalty costs per unit flow time for lot i. This variable is used to account for situations where some jobs are more important than others. Moreover, "flow time" is batch completion time minus the lot's arrival time at the batch area.

NOTATION—Method Outputs x(i, b): decision variable that is 1 if lot i assigned to batch b, and 0 otherwise. This determines what lots are assigned to which batches.

y(b, j): decision variable that is 1 if batch b is assigned to tool j and has at least one lot assigned to it, and 0 otherwise. This determines what batches are assigned to which batch processors.

t(b): release time of batch b. This is the pre-determined time processing begins (for WETS tool) or departure time (for transport vehicle).

r(i): release time of lot i.

f(i): flow time for lot i.

In the exemplary aspect described herein, it is assumed that all available batch processors (e.g., WETS tools) are idle at the time the method is executed. For applications where this assumption is not valid, the appropriate model adjustments will be known to a skilled artisan.

Based on the above assumption, the cost weighted flow time can be written explicitly as:

F=Sum(i=1, . . . , N) {c(i)*(t(i)+RP−r(i))}=Sum(i=1, . . . , N)c(i)*f(i)

And thus the objective function for evaluating the quality of the schedule is:

Min{Z=Sum(i=1, . . . , N)c(i)*f(i)+Sum(j=1, . . . , J)Sum(b=1, . . . B)BC(b)*y(b, j)}

The problem has the following associated constraints:

Packing Constraints:

Sum(i=1, . . . , N)S(i)*x(i, b)<=BS, for b=1, . . . , B

Batch Release/Lot Release Consistency:

x(i, b)<=Sum(j=1, . . . , J)y(b, j)

Lot Assignment:

Sum(b=1, . . . , B)x(i, b)=1, for i=1, . . . , N

Batch Flow Time:

t(b)>=max(r(i)*x(i, b), i=1, . . . , N), b=1, . . . , J t(b)>=max(min(t(b−1)+RP, . . . , t(b−J)+RP), max(r(i)*x(i,b), i=1, . . . , N), for b>=J+1

Lot Flow Time:

f(i)=Sum(b=1, . . . , B)(x(i, b)*t(b)−r(i)+RP), for i=1, . . . , N

Discrete Constraints:

Variables (x, y) are restricted to be binary

To describe an algorithm constructed according to the principles of the invention a heuristic method for determining a feasible and near optimal solution to the problem with reasonably low computational burden is provided as an example. The method begins by defining X(M, b)={x(1, 1), x(1, 2), . . . ,x(M−1,b), x(M, b)} as a feasible assignment of lots in set M, to b batches. Let:

M(i, j) represent the interchange of the allocation of lots i and j in lot assignment M.

"M+i" represent the addition of lot i to (partial) assignment M.

F(X(M, b)) denote the cost weighted flow time for lots in set M based on assignment X(M, b).

The following is a pseudo code summary of the basic steps of the algorithm. Skilled artisans reading this pseudo code in combination with the descriptions thereof contained herein, will be able to code the inventive algorithm, and variations thereof, into machine-executable code using virtually any known or future-developed programming language. Illustrative known programming languages include, but are not limited to, C++, JAVA, FORTRAN and similar languages.

With reference to FIG. 3, the process may be illustrated by the following pseudo-code snippets:

```
//Initialize Sets and Variables
Batch_Cost=BC(1); //create an initial estimate
Z_original=infinity;
Z_best_solution=infinity;
Z=1;
M=NULL;
M_best_solution=NULL;
Iteration_count=0;
Tolerance=stopping criteria
Sort lots in order of increasing release times, decreasing priorities, and descending lot quantities:
//Loop through passes if there is potential for improvement
While (Iteration_count<1000 or ((Z−Z_original)/Z)>Tolerance){
M=NULL;
b=0;
Current_Batch_Size=0;
//Greedy allocation
While(Cardinality(M)<N){
b=b+1;
y(b, j)=1 for first tool j that becomes idle based on assignment thus far
//Initialize batch b with its first lot
k=argmin_{i=1, . . . , N}(r(i), such that lot i is not yet assigned to a batch);
M=M+k;
Current_Batch_Size=S(k)
For(i not in M){
//Check if lot should be added to current batch based on cost and batch size constraint
If((F(X(M+i, b)−F(X(M, b))<Batch_Cost*S(i)/BS) and (Current_Batch_Size+S(i)<BS)){
M=M+i;
Current_Batch_Size +=S(i);
}//end if( )
//if current batch is full then exit loop and iterate to next batch
If (Current_Batch_Size ==BS) break;
}//end For( )
}//end While( )
//Search for lucrative interchanges of lots
For(i=1, . . . , N){
For(all j not in batch containing lot i){
If(M(i, j) is a feasible interchange)
then If (Z(X(M(i, j),b))<Z(X(M, b)) then M=M(i, j);
}//end For( )
}//end For( )
//Reset Batch_Cost as moving average of previous passes
Iteration_count=Iteration_count+1;
Batch_Cost=((Iteration_count−1)*Batch_Cost+BC(b))/Iteration_count
Z_original=Z;
Z=Z(X(M));
//Save solution if better than current best
if(Z<Z_best_solution) {
Z_best_solution=Z;
M_best_solution=M
}
}//end While( )
```

It will be recognized by those in the art that there are many alternative implementations of the above invention. For instance, priorities based on factors including demand priority, capacity availability, critical ratio, etc. are often a consideration in production planning and scheduling systems. The weighting factor $c(i)$ can be used to describe priority considerations by increasing or decreasing the relative weighting of flow time based on the lot i. Further, production scheduling is often impacted by inherent uncertainty in the execution of events. For example, the projected release time of a given lot, $r(i)$, may change due to unanticipated events (e.g. the lot goes on hold, tools require unscheduled maintenance, etc.). To capture the impact of uncertainty the above-described system may be run repeatedly with a rolling planning horizon to update the allocation of lots to batches based on the most current information available at the time at which a batch is to be released. To achieve this periodic rescheduling the above-described invention may be utilized on a periodic basis (e.g. 1 hour intervals) or on an event basis (e.g. availability of a lot for release, tool availability, etc.).

The steps for implementing the invention may be programmed in C/C++. It should be understood by those of ordinary skill in the art, however, that the invention is not limited to the above implementation and is independent of the computer/system architecture. Accordingly, the invention may equally be implemented on other computing platforms, programming languages and operating systems, and also may be hardwired into a circuit or other computational component. Moreover, in accordance with various aspects of the invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the invention has been described with reference to several exemplary aspects, it is understood that these exemplary aspects are not to be construed as limitations. For example, the process herein may be used with transporting applications. By way of a non-limiting example, one aspect of the invention may be used for transporting lots or packages. By using the method of the invention, a most optimal process can be determined for delivering the lots or packages by a limited number of delivery routes and/or delivery mechanisms (e.g. trucks and airplanes). These delivery routes and/or delivery mechanisms form the aforementioned batch operations that can process multiple lots or packages at a time as a batch. So, in one implementation, the method can be used to determine the most optimal assignment of packages placed in a truck prior to beginning the delivery route, even though others packages will be delivered at a later stage, and may have warranted placement on the same trucks.

Moreover, although the present invention has been fully described above with reference to specific embodiments, other alternative embodiments will be apparent to those of ordinary skill in the art. Therefore, the above description should not be taken as limiting the scope of the present invention defined by the appended claims.

What is claimed is:

1. A method of scheduling work-pieces to determine a production plan, the method comprising:
   assigning lots to batches based on a comparison of a resultant impact to a mean flow time with a continuously approximated variable cost-per-batch; and
   iteratively reassigning one or more of the assigned lots based on output feasible lot alternatives and a set of convergence criteria to optimize the resultant impact to the mean flow time and the continuously approximated variable cost-per-batch,
   wherein the method examines possible pair-wise lot interchanges and executes an interchange if it improves lot assignment.

2. The method of claim 1, wherein the iteratively reassigning further comprises:
   exploring at least one possible interchange of lots to the batches; and
   monitoring changes in the continuously approximated variable cost-per-batch for each iterative reassignment.

3. The method of claim 2, wherein the iteratively reassigning further comprises backtracking and reassigning lots to batches based on the increased cost-per-batch.

4. A computer program product comprising a computer usable medium having readable program code embodied in the medium, the computer program product includes at least one component to execute the method according to claim 1.

5. A manufacturing system that manufactures articles from work-pieces operating in accordance with the method of claim 1.

6. The method of claim 1, wherein the method one of:
   utilizes a greedy assignment process and effectively trades off a schedule that minimizes a number of batches to a schedule that minimizes the mean flow time; and
   utilizes a greedy and interchange algorithm that is applied iteratively.

7. The method of claim 1, further comprising inputting a projected or forecasted stream of lots and their expected arrival times.

8. The method of claim 1, further comprising processing the batches in at least one tool having a variable cost associated therewith.

9. The method of claim 1, wherein the method takes into consideration lot arrival times spread across time and non-linearality of the cost-per-batch, and utilizes a greedy and interchange algorithm.

10. A process of associating one of a plurality of lots to one of a plurality of batches for one of dispatching, shipping, producing, and manufacturing, the process comprising:
    assigning the plurality of lots into the plurality of batches;
    repeatedly assigning at least one of the plurality of lots to a different one of the plurality of batches;
    determining when to stop repeatedly assigning; and
    selecting a specific assignment of the plurality of lots to the plurality of batches to optimize a resultant impact to a mean flow time and a cost-per-batch,
    wherein the method utilizes a greedy assignment process and effectively trades off a schedule that minimizes a number of batches to a schedule that minimizes the mean flow time.

11. The process according to claim 10, wherein the assigning is based on an arrival time of each of the plurality of lots.

12. The process according to claim 10, wherein the repeatedly assigning further comprises interchanging pairs of lots to different batches.

13. The process according to claim 10, wherein the determining when the process should stop repeatedly assigning is based on a predetermined iteration limit.

14. The process according to claim 10, wherein the determining when the process should stop repeatedly assigning is based on a minimal improvement of the resultant impact to the mean flow time and a continuously approximated variable cost-per-batch.

15. The process according to claim 10, wherein the selecting a specific assignment of the plurality of lots is based on one of the resultant impact to the mean flow time and a resultant cost.

16. The process according to claim 10, wherein the selecting a specific assignment of the plurality of lots is based on the resultant impact to the mean flow time and a resultant cost.

17. A computer readable medium for storing a computer program that executes the process according to claim 10.

18. A computer program product comprising a computer usable medium having readable program code embodied in the medium, the computer program product includes at least one component to:
    assign a plurality of lots into one of a plurality of batches;
    repeatedly assign at least one of the plurality of lots to a different one of the plurality of batches;
    determine when to stop repeatedly assigning; and
    select a specific assignment of the plurality of lots to the plurality of batches to optimize a resultant impact to a mean flow time and a cost-per-batch, wherein the method utilizes a greedy assignment process and effectively trades off a schedule that minimizes a number of batches to a schedule that minimizes the mean flow time.

19. The computer program product according to claim 18, wherein the assign step comprises sorting is based on an arrival time of each of the plurality of lots.

20. The computer program product according to claim 18, wherein the repeatedly assigning further comprises interchanging pairs of lots to different batches.

21. The computer program product according to claim 18, wherein the determining when to stop repeatedly assigning is based on a predetermined iteration limit.

22. The computer program product according to claim 18, wherein the determining when the process should to stop repeatedly assigning is based on minimal improvement of the resultant impact to the mean flow time and a continuously approximated variable cost-per-batch.

23. The computer program product according to claim 18, wherein the selecting a specific assignment of the plurality of lots is based on a batching cost.

24. A method of scheduling work-pieces to determine a production plan utilizing a greedy and interchange algorithm that is applied iteratively, the method comprising:

sorting lots prior to assigning the lots into batches having variable costs associated therewith;

executing a series of iterations in order to assign lots to the batches based on an estimated batch cost that changes based on results of each iteration;

determining whether to stop iterating;

outputting a best lot assignment found during the iterating to a dispatching system;

performing a greedy assignment of lots;

executing an interchange if it improves lot assignment; and assigning the lots to the batches after examining each unassigned lot, in sequence, and determining whether an incremental impact on an objective function from adding the lot to the batch is favorable or adverse, whereby the lot is added is favorable and not added is adverse, wherein the greedy assignment determines whether to add the lot to the batch without examining an impact of the assignment on other lots which have not yet been assigned.

* * * * *